United States Patent
MacIntosh, Jr.

[11] Patent Number: 5,997,137
[45] Date of Patent: Dec. 7, 1999

[54] MODULAR EYEWEAR ASSEMBLY

[75] Inventor: Charles M. MacIntosh, Jr., Middleboro, Mass.

[73] Assignee: The Hilsinger Company LP, Plainville, Mass.

[21] Appl. No.: 09/133,778

[22] Filed: Aug. 12, 1998

[51] Int. Cl.[6] .................................... G02C 1/04
[52] U.S. Cl. .................... 351/41; 351/103; 351/108
[58] Field of Search ................ 351/41, 103–109, 351/154, 65

[56] References Cited

U.S. PATENT DOCUMENTS

| | | | |
|---|---|---|---|
| 235,930 | 12/1880 | Borsch | 351/110 |
| 2,099,748 | 11/1937 | Mertens | 351/103 |
| 2,151,668 | 3/1939 | Vitolo | 351/106 |
| 2,208,103 | 7/1940 | Paterson | 351/106 |
| 2,254,746 | 9/1941 | Line | 351/106 |
| 2,362,725 | 11/1944 | Slotsky | 351/106 |
| 2,398,137 | 4/1946 | Dunham | 351/106 |
| 2,439,357 | 4/1948 | Bouchard | 351/106 |
| 2,519,852 | 8/1950 | Ring | 351/63 |
| 2,825,267 | 3/1958 | Gagnon | 351/110 |
| 5,135,296 | 8/1992 | Linberg et al. | 351/103 |
| 5,455,639 | 10/1995 | Magdelaine et al. | 351/47 |
| 5,523,805 | 6/1996 | Kuipers et al. | 351/86 |
| 5,585,869 | 12/1996 | Weber | 351/83 |

*Primary Examiner*—Huy Mai
*Attorney, Agent, or Firm*—Barlow, Josephs & Holmes, Ltd.

[57] ABSTRACT

A modular reader assembly, with a wire frame construction is provided. A pair of eyeglass lenses are releasably engageable with the frame assembly by use of a spring-biased wire frame material. Each of the lenses are secured in place by at least three contact points at notches positioned at the inner, upper and outer edges of the lens. Lenses of different sizes, configurations, thicknesses and powers are easily accommodated even where the sizes and configurations of the lenses differ between the left and right eyes.

13 Claims, 5 Drawing Sheets

MODULAR EYEWEAR ASSEMBLY

BACKGROUND OF THE INVENTION

The present invention relates generally to an eyeglass frame assembly. More specifically, the present invention relates to a modular eyeglass reader assembly which can accommodate a wide range of lens sizes and powers.

In the optical and eyeglass industry, it has been well-known to employ an outer frame for carrying a pair of optical lenses for vision correction, UV protection, sun shading, and the like. Typically, these frames are rigid members which receive and secure the lenses thereto. Temples and ear loops on the free ends thereof are provided to complete the eyeglass frame structure. Sill further, nose pads are commonly provided to serve as cushioning of the eyeglass frame structure to the nose of the wearer.

In the most common configuration of eyeglasses, the lenses are secured to the frame in a substantially permanent fashion by use of an encircling band of metal or plastic which is maintained in a closed position by use of a screw, rivet or the like. In this common configuration, custom lenses must be employed to fit precisely within the frame configuration at hand. The particular thickness of the lens, corresponding to the power and/or style of the lens, must be compatible with the particular frame selected by the wearer. As a result, significant time and effort must be expended, due to the required customization, to assemble an eyeglass assembly.

The foregoing is particularly evident when eyeglass readers, also known as reading glasses, are the desired spectacle configuration. It is common for a person in need of reading glasses to have multiple pairs of such reading glasses so that such vision correction is available at multiple locations, for example the home and the office. Such a need for reading glasses or eyeglass readers necessitates a custom fit assembly each time a new pair of readers are purchased. As a result, the purchase of reading glasses is unnecessarily time consuming and laborious for the eye care professional. Still further, a person in need of reading glasses does not have a wide range of flexibility in their selection of frames due to the limited lens shape and thickness selection for that particular frame. Since typical eyeglass reader frames require a particular lens shape and thickness for compatibility purposes, a person in need of an exceedingly strong powered lens would likely have a heavy, uncomfortable and cosmetically unappealing appearance.

In the prior art, attempts have been made to provide a rimless and semi-rimless style of eyeglass frame to meet the needs and receive lenses of varying sizes, configurations and thicknesses. For example, U.S. Pat. No. 2,439,357, issued to Bouchard, discloses a lens holding frame with a semi-rimless tension spectacle mounting. This patent discloses flexible metal arms with protrusions at the free ends thereof for releasably engaging with respective notches on opposing ends of a given lens. In addition, U.S. Pat. No. 2,208,103, issued to Paterson, discloses an eyeglass frame which includes a rimless construction where each of the eyeglass lenses are retained in place by a pair of spring-biased protrusions engaging with a respective pair of notches in the eyeglass lens itself. The foregoing patents of the prior art allow for the quick and immediate attachment of the appropriate lens in accordance with the needs of the wearer. The semi-rimless frames of the prior art can accommodate lenses of different sizes since they grasp onto the lens from its upper portion. In general, the spring-loaded snap-in design of the prior art eyeglass constructions provide for fast assembly by the eye care professional.

However, the prior art semi-rimless eyeglass construction suffer from many disadvantages. In particular, these known construction can only accommodate a small range of different types of lenses. In particular, due to the particular mounting structure provided in the prior art, lenses of different thicknesses and vastly different configurations cannot be easily accommodated. Prior art eyeglass constructions are particularly deficient in their inability to accommodate lenses of different powers and thicknesses within the same frame. For example, the prior art constructions are unable to easily accommodate a relatively thick high-power lens in the left eye while simultaneously accommodating a relatively lower power lens in the right eye. In general, the prior art constructions require that both of the lenses carried be of the same or similar power, or at least the same or similar thickness. Such a limitation greatly reduces the flexibility of use and application and availability of a given eyeglass frame.

In addition, the prior art eyeglass configurations discussed above are expensive to manufacture and they also require the use of tools for the actual installation of the lenses into the frame.

In view of the foregoing, there is a demand for an eyeglass frame which can easily accommodate a wide array of lens shapes, configurations, sizes and thicknesses as well as a mix thereof within the same frame. It is further desired for an eyeglass frame to include the ability to easily install the eyeglass lenses without the need for additional tools. Further, it is also desirable for an eyeglass frame to be able to accommodate two different powers of lenses within the same frame while being aesthetically pleasing in appearance. An eyeglass frame should also be very easy and inexpensive to manufacture yet be able to securely hold a hand-installed lens without fear of it being separated from the frame.

SUMMARY OF THE INVENTION

The present invention preserves the advantages of prior art eyeglasses and modular assemblies for eyeglasses. In addition, it provides new advantages not found in currently eyeglass assemblies, and overcomes many disadvantages of such current available assemblies.

The invention is generally directed to a novel and unique modular reader assembly with particular application in accommodating lenses of different sizes, thicknesses and powers. The modular reader assembly of the present invention has particular application in immediately accommodating lenses of different types, sizes, configurations and powers. The present invention provides a universal-type eyeglass frame assembly which provides great flexibility in lens selection for the wearer.

The preferred embodiment of the present invention includes three primary members. A frame is provided which is made from a length of resilient wire material where the wire material is bent into such a configuration whereby three connection points are provided for each of the two lenses. Each of the lenses is provided with an outer notch for releasable engagement with an outer connector, an upper notch for engagement with an upper connector as well as an inner notch for engagement with an inner connector. Each of the connectors of the wire frame are formed and defined by various specific portions of the wire frame assembly.

For installation of a lens, in accordance with the present invention, it is preferred that the outer notch of a lens be first engaged with an outer connector region of the wire frame. Then, the upper notch of the lens is engaged with the upper connector of the frame. Finally, the inner connector is snappingly engaged with the inner notch of the lens to complete the attachment of the lens to the frame. Due to the spring-biased nature of the wire frame, the lens is clampingly engaged to the frame. To remove the lens, the process is simply reversed whereby the inner connector portion of the wire frame is disconnected or removed from the inner notch of the lens. Once this has been carried out, the lens can be simply removed.

In the manufacture of the present invention, a length of wire material is bent using a five-plane bending machine to place the desired connector and bearing point throughout the length of the frame for proper engagement with the notches of the lenses. The wire is naturally spring-biased, even after bending, to provide the needed clamping action for the eyeglass lenses.

It is therefore an object of the present invention to provide a modular reader assembly.

Another object of the present invention is to provide an eyeglass assembly which can releasably engage an eyeglass lens.

Another object of the present invention is to provide an eyeglass assembly which can releasably engage a wide array of lens types, sizes, configurations and thicknesses.

It is a further object of the present invention to provide an eyeglass assembly which can accommodate lenses which can releasably accommodate lenses of two different thicknesses within the same eyeglass frame.

It is yet a further object of the present invention to provide an eyeglass assembly which clampingly secures an eyeglass lens to the wire frame.

It is another object of the present invention to provide an eyeglass assembly which is made from a length of wire material. It is another object of the present invention to provide an eyeglass assembly which is simple and inexpensive to manufacture.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
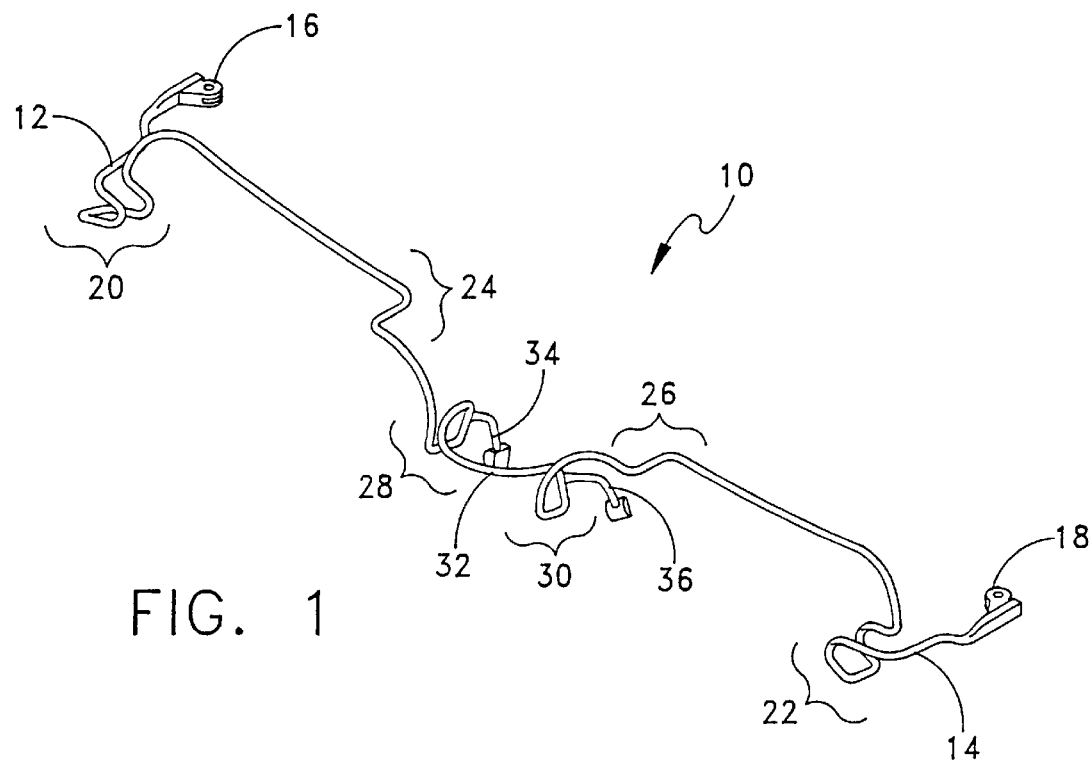
FIG. 1 is a perspective view of the modular eyeglass frame assembly of the present invention.
Figure 2:
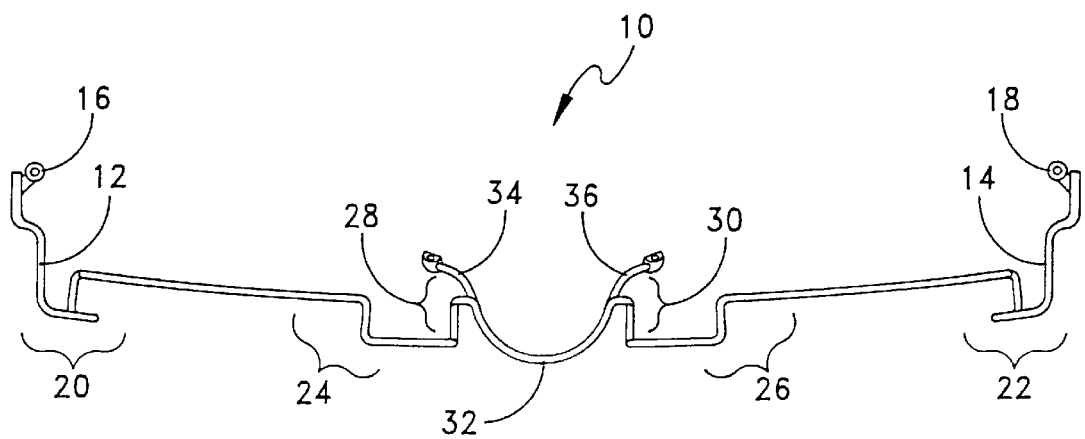
FIG. 2 is a top view of the eyeglass assembly of FIG. 1.
Figure 3:
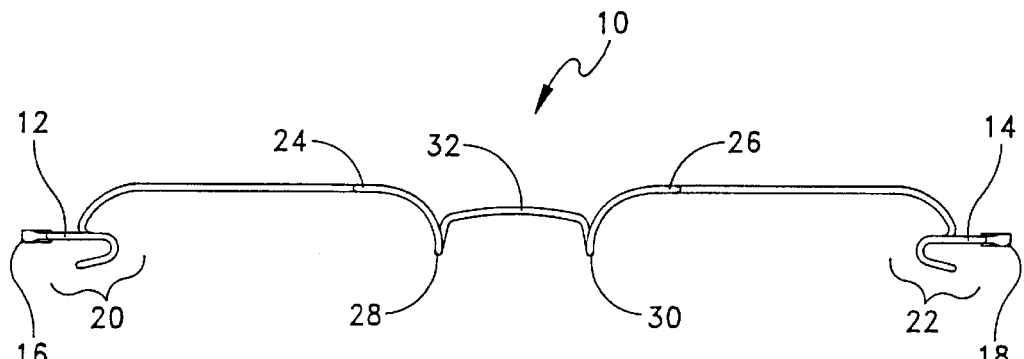
FIG. 3 is a front view of the eyeglass assembly of FIG. 1.

Referring to FIGS. 1–3, the new and novel eyeglass frame assembly 10 of the present invention is shown. FIG. 1 illustrates a perspective view of the novel frame employed in the present invention. In addition, FIG. 2 shows a top view of the frame of FIG. 1 while FIG. 3 shows a front view of the frame of FIG. 1. Referring generally to FIGS. 1–3, the novel frame assembly 10 employed in the present invention generally provides a structure for releasably securing two eyeglasses lenses, as will be discussed in detail below, so that they may be maintained in the proper position, alignment and orientation in front of a wearer's eyes. FIGS. 1–3 generally show the frame assembly 10 to include a right temple connector 12 with a right temple hinge mount 16 connected thereto. A right lens outer notch mount, generally referred to as 20, is connected thereto. A right lens upper notch mount, generally referred to as 24, is also provided and connected to right lens inner notch mount which is generally referred to as 28.

On the left side of the eyeglass frame assembly 10, a left temple connector 14 is provided with a left temple hinge mount 18. A left lens outer notch mount, generally referred to as 22, is connected thereto. In addition, a left lens upper notch mount, generally referred to as 26, is provided along with a left lens inner notch mount which is generally referred to as 30.

Right lens outer notch mount 20, right lens upper notch mount 24 and right lens inner notch mount 28 provide the primary securing and retention structure for maintaining the right eyeglass lens (not shown) within frame assembly 10. In addition, left lens outer notch mount 22, left lens upper notch mount 26 and left lens inner notch mount 30 provide the general securing and retention structure for the left lens (not shown) mounted within frame assembly 10 of the present invention. Bridge member 32 is positioned between the two general sides of the eyeglass frame assembly 10 and serves to position the two lenses from one another as well as provide a substrate for right nose pad mount 34 and left nose pad mount 36.

As can best be seen in FIGS. 1–3, the entire length of frame assembly 10 from right temple connector 12 to left temple connector 14 is made of an elongated length of material, such as metal wire. In the manufacture and construction of frame assembly 10 of the present invention, the various bends and turns of the material is accomplished and carried out by a five plane wire bending machine, for example. Right temple hinge mount 16 and left temple hinge mount 18 and well as right nose pad mount 34 and left nose pad 36 are, preferably, soldered onto the meandering and configured length of metal wire material. The employment of a five plane wire bending machine greatly reduces the cost of manufacture and adds flexibility to the adaptation of the design to a wire array of applications which include the variation of sizing and configuration of the frame assembly 10. Further, as will be seen in detail below, the meandering configuration of frame assembly 10 provides superior containment and retention control of an installed eyeglass lens while still being hand or manually installable. In that connection, the use of such a wire frame assembly 10, the entire structure is inherently spring-biased to accommodate an eyeglass lens installed therein.

Figure 4:
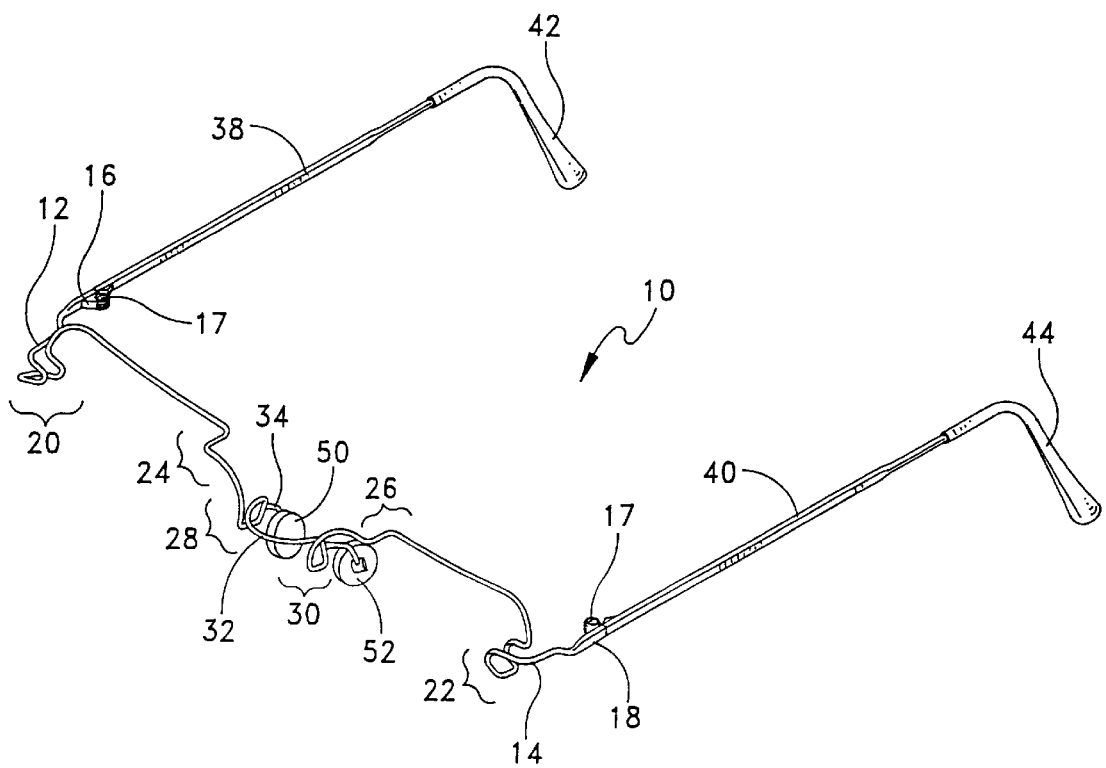
FIG. 4 is a perspective view of the eyeglass frame of FIG. 1 fitted with temples and ear loops.

Referring now to FIG. 4, right temple 38 and left temple 40 are hingedly connected to right temple hinge mount 16 and left temple hinge mount 18, respectively. This hinged connection may be carried out by use of screws 17, or the like. Still further, to complete the frame assembly 10 of the present invention, right ear hook 42 and left ear hook 44 are affixed to the free ends of right temple 38 and left temple 40, respectively. In addition, right nose pad 50 and left nose pad 52 are installed onto right nose pad mount 34 and left nose pad mount 36, respectively, in a fashion known in the art, such as the use of a post and screw mount (not shown). As a result, the frame assembly 10 shown in FIG. 4 is in a completed form and in condition for the installation of the left and right eyeglass lenses.

Figure 5:
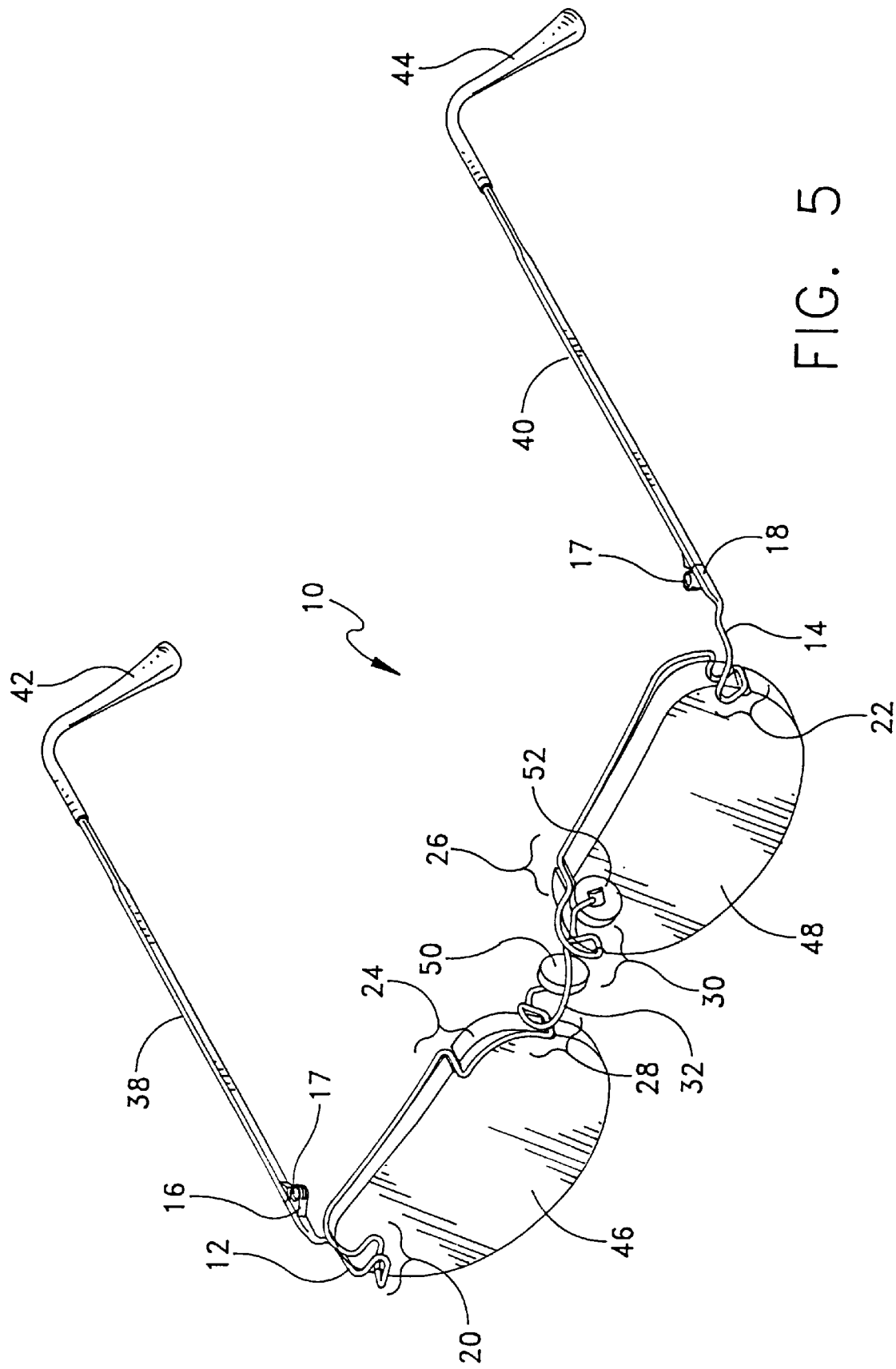
FIG. 5 is a perspective view of the eyeglass assembly of FIG. 4 with eyeglasses lenses and nose pads installed.
Figure 6:
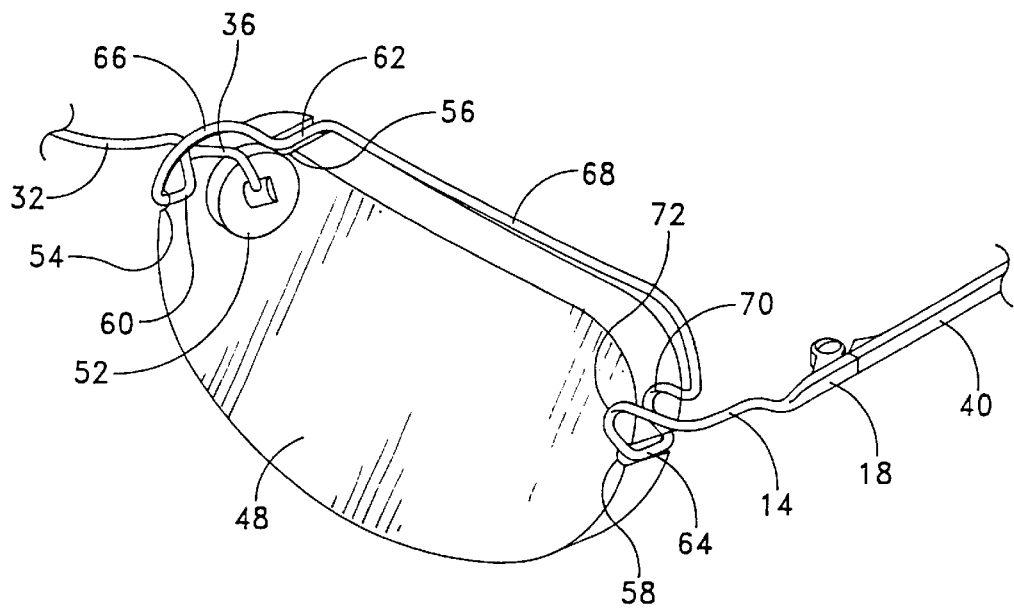
FIG. 6 is a close-up perspective view of the left lens and the installation thereof forming the eyeglass assembly of the present invention.

Referring now to FIG. 5, a perspective view of the frame assembly 10 of the present invention with right lens 46 and left lens 48 installed therein. FIG. 6 illustrates a close-up view of the installation of left lens 48 into the left side of frame assembly 10. For ease of illustration, the following installation of a lens into frame assembly 10 will be discussed in connection with left lens 48. It should be understood that right lens 46 is installed in the same, but mirror-image fashion, to the installation of left lens 48.

Figure 10:
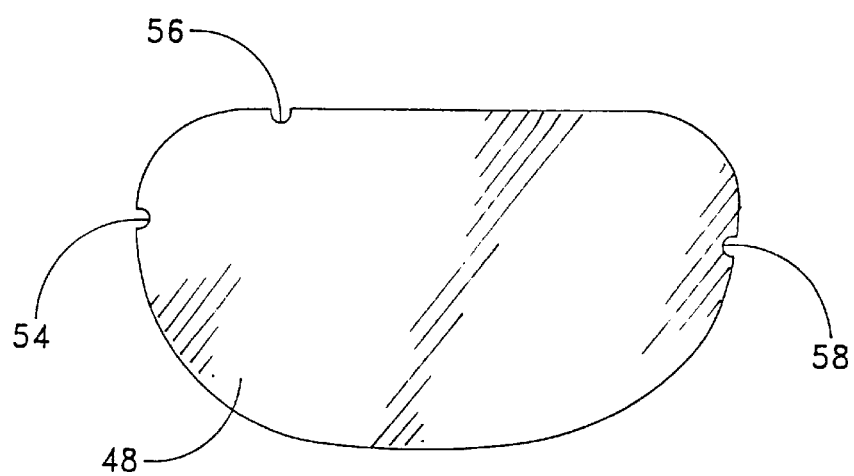
FIG. 10 is a front view of a left eyeglass lens in accordance with the present invention.

Referring specifically to the detailed perspective view of the present invention in FIG. 6, and as shown in FIG. 10, left lens 48 includes a inner lens notch 54, an upper lens notch 56 as well as an outer lens notch 58. As best seen in FIG. 6, inner lens notch 54 serves as a seat to receive inner engagement member 60 which is a portion of the length of the frame material which is connected to bridge 32. The wire material of frame assembly 10 extends from inner engagement member 60 through inner lens notch 54 to the front face of left lens 48 at wire section 66. Upper lens notch 56 provides a seat for upper engagement member 62 which is a portion of wire material connected directly to wire section 66. The wire material then extends behind or over the rear surface of left lens 48 at wire section 68 to form a loop at rear loop 70. Outer lens notch 58 of left lens 48 provides a seat for outer engagement member 64 which is connected directly to rear loop 70 portion of the wire material of frame assembly 10. A front loop 72 is also provided which passes in front of left lens 48 which is in turn connected to left temple connector 14.

As a result of the foregoing, left lens 48 is secure at the substantial upper portion thereof at three critical juncture points to ensure superior stabilization of the lens within frame assembly 10. The wire material of frame assembly 10 is preferably a resilient metal wire material which is circular in cross section. However, other frame structures made of plastic and of different cross-sections are also considered to be within the scope of the invention. Still further, the frame material may be formed in the configuration disclosed herein by a molding or casting process as opposed to the preferred construction method employing a five plane bending machine. Such bending methods are still contemplated herein and are within the scope of the present invention.

Referring both to FIGS. 5 and 6, it can be readily seen that frame assembly 10 of the present invention is, essentially, a semi-rimless design whereby the upper portion of eyeglass lens 46 and 48 are secured at their upper portions. This enables a wide array of sizes, configurations and powers to be accommodated within the frame assembly of the present invention. For example, large lenses or lenses of different shapes can be easily employed because it is the top or upper surface of the lens which is actually secured to the frame assembly 10.

Figure 7:
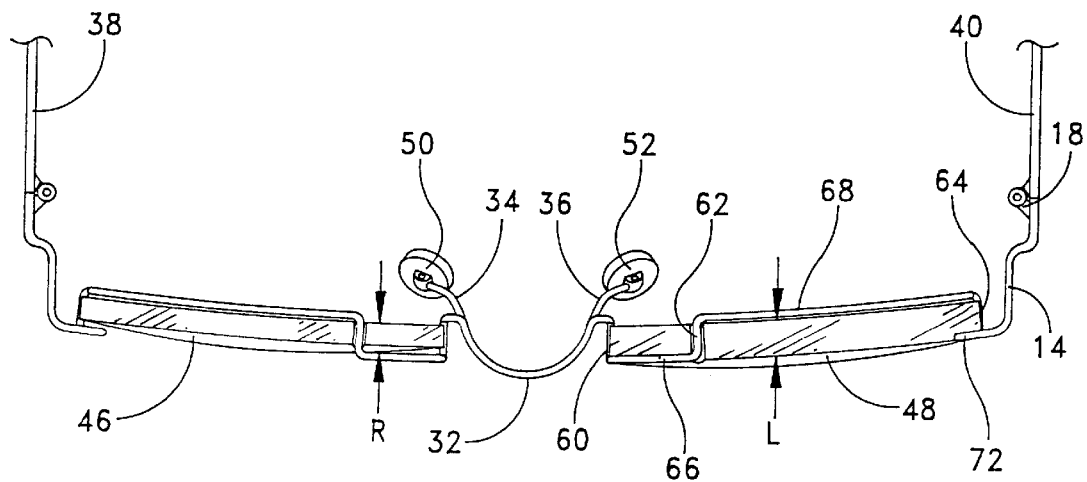
FIG. 7 is a top view of the eyeglass assembly of FIG. 5 with lenses installed therein.

The flexibility of the present invention to accommodate a wide array of different types of lenses can be readily seen in FIG. 7. It is common for a person in need of glasses, particularly reading glasses, to be in need of different strength lenses in different eyes. For example, the left eye of the wearer may need a stronger prescription than the right eye of the wearer. As seen in FIG. 7, a thicker, more powerful lens 48 can be easily accommodated as left lens while a thinner, relatively lower power lens may be provided as right lens 46 with no modification to the existing frame assembly 10 of the present invention. In particular, thickness L of left lens 48 is easily accommodated between or within the width of frame assembly 10 between wire section 66 and wire section 68. The width or depth of engagement members 60, 62 and 64 are enough to easily accommodate a thick, high power lens such as that shown in FIG. 7. Still further, the thin lens, shown as right lens 46 in FIG. 7, can be easily accommodated when there is a thinner thickness, designated as R. Therefore, varying types of lenses can be accommodated simultaneously within the same frame assembly 10 of the present invention.

Figure 8:
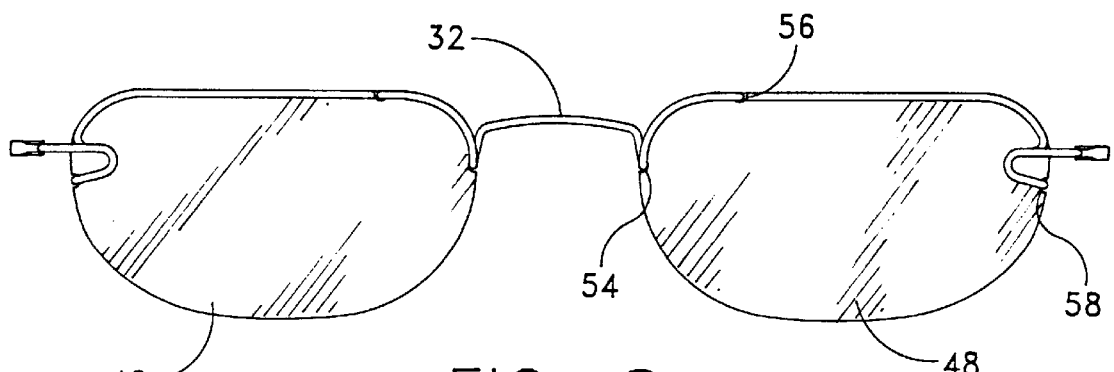
FIG. 8 is a front view of the completed eyeglass assembly of FIG. 5 in accordance with the present invention.
Figure 9:
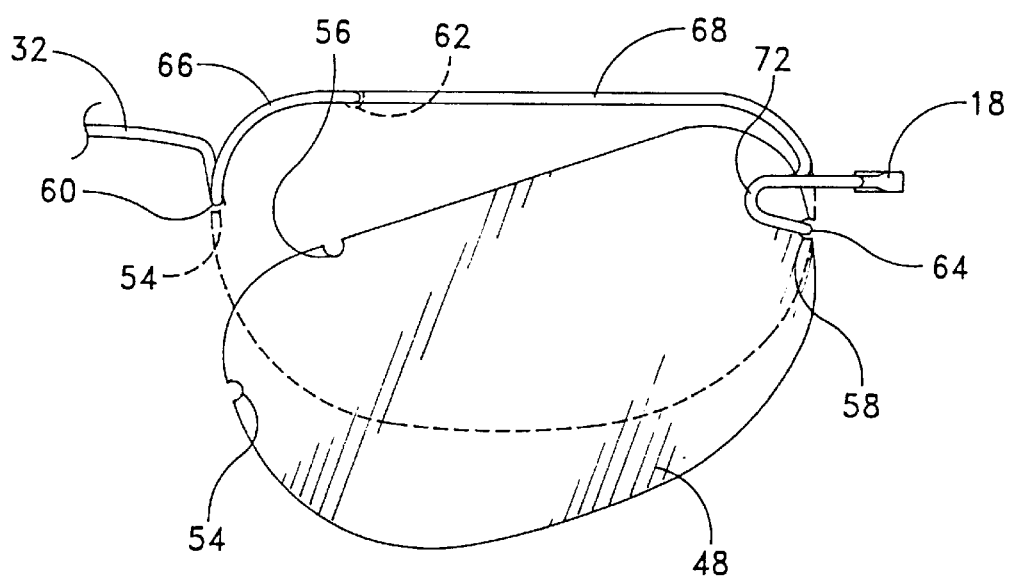
FIG. 9 is a close-up view of the left portion of the eyeglass assembly of the present invention showing the installation and removal of an eyeglass lens.

Turning now to FIGS. 8–10, the installation of lens 46 and 48 are shown. In practice, an assembled frame assembly 10 with lenses 46 and 48, of the present invention, can be incorporated easily into a modular reader eyeglass assembly program. The present invention is particularly conducive to such a program where an eye care professional, after completing the necessary eye tests, can quickly and easily install the appropriate lenses in accordance with the needs of the wearer or patient. Frame assembly 10 may be constructed into a universal or standardized configuration which can accommodate different types of lenses. The eye care professional, upon determining the appropriate lens strength for each eye of the patient, can immediately install the lenses of the appropriate power. The easy installation construction of the present invention permits the eye care professional to greatly customize the product to suit the patient; namely, provide the exact required lens power, even where the powers differ between the left and right eyes of the patient.

FIG. 8 illustrates a front view of the present invention with right lens 46 and left lens 48 installed. To illustrate the installation of an eyeglass lens, FIG. 9 shows the installation of left lens 48, by way of example. Right lens 46 is installed in identical, but reverse fashion. The preferred installation of a lens, such as left lens 48, includes first seating outer engagement member 64 into outer lens notch 58. The lens 48 is then, preferably, pivoted in a clockwise fashion about outer engagement member 64 and outer lens notch 58 so that upper engagement member 62 seats within upper lens notch 56. Then, inner engagement member 60 is snapped into seating engagement with inner lens notch 54 to secure lens 48 in place within frame assembly 10. Since the material of frame assembly 10 is preferably a resilient wire material, it provides spring biasing at notches 54, 56 and 58 of lens 48 to retain lens 48 in place. Against this spring-biasing, members 60, 62, and 64 may be easily removed from their respective notches in lens 48. As a result, lens 48 is completely releasably engageable with frame assembly 10.

The meandering configuration of frame assembly 10 provides superior retention of lenses 46 and 48 within frame assembly 10. As can be seen in FIGS. 6 and 7, movement of left lens 48 within frame assembly 10 is practically eliminated because it is secured on three of its sides, namely at notches 54, 56 and 58. The present invention also provides a structure for preventing a lens from rolling about front to back within frame assembly 10. Specifically, wire section 66 is positioned immediately adjacent to the front of left lens 48 while wire section 68 is positioned immediately adjacent to the rear surface of left lens 48. Still further, rear loop 70 and front loop 72 provide further stabilization of lens 48 within frame assembly 10. Right lens 46 is similarly immobilized.

As a result, lenses 46 and 48 are firmly secured within frame assembly 10 despite being easily removable from frame assembly 10. As a result, the frame assembly 10 of the present invention, including the installation of lenses 46 and 48, provides a quality, customized eyeglass assembly while providing the benefits of easily removable lenses while ensuring maximum safety protection.

It would be appreciated by those skilled in the art that various changes and modifications can be made to the illustrated embodiments without departing from the spirit of the present invention. All such modifications and changes are intended to be covered by the appended claims.

What is claimed is:

1. A modular eyewear assembly, comprising:

a pair of lenses spaced apart from one another, each having an outer edge and a front surface and a rear surface; each of said pair of lenses having a plurality of notches extending inwardly from said outer edge of each of said lenses; and a frame made from resilient material; said frame including a pair of resilient lens receptacles to respectively receive said pair of lenses; each of said lens receptacles including a plurality of spring-biased bearing members corresponding to said plurality of notches in each of said lenses; said bearing members being removably engageable with each of said notches in each of said lenses; said bearing members being sections of said resilient material which are configured for being substantially perpendicular to said front surface and said rear surface and being substantially parallel and adjacent to said front surface of said lenses and being engageable with said plurality of notches corresponding thereto.

2. The modular eyewear assembly of claim 1, wherein said frame is manufactured of metal.

3. The modular eyewear assembly of claim 1, wherein said frame is manufactured of plastic.

4. The modular eyewear assembly of claim 1, wherein each of said pair of lenses include an upper edge, a left edge, a right edge and a lower edge; said pair of lenses, each respectively defining a set of three notches, one in said upper edge of each of said pair of lenses, one in said left edge of each of said pair of lenses and one in said right edge of each of said pair of lenses; said three notches of each of said lenses being engageable with corresponding ones of said bearing members of said frame.

5. The modular eyewear assembly of claim 1, further comprising:

a pair of nose pads connected to said frame.

6. The modular eyewear assembly of claim 1, further comprising:

a pair of temples connected to opposing ends of said frame.

7. The modular eyewear assembly of claim 1, wherein said resilient material is an elongated length of wire.

8. A modular eyewear assembly, comprising:

a left lens having a left edge, a right edge, an upper edge and a lower edge, a front surface and a rear surface; said left lens having a notch extending inwardly from said left edge of said left lens, a notch extending inwardly from said upper edge of said left lens and a notch extending inwardly from said right edge of said left lens;

a right lens having a left edge, a right edge, an upper edge and a lower edge, a front surface and a rear surface; said right lens being in spaced apart relation to said left lens; said right lens having a notch extending inwardly from said left edge of said right lens, a notch extending inwardly from said upper edge of said right lens and a notch extending inwardly from said right edge of said right lens;

a frame made from resilient wire material; said resilient wire material including a first region extending substantially parallel to said left edge of said right lens and extending into communication with said front surface of said right lens, a second region connected to said first region and being positioned substantially parallel to said left edge of said right lens and releasably engageable with said notch in said left edge of said right lens, a third region connected to said second region and extending along said upper edge of said right lens and adjacent to said rear surface of said right lens, a fourth region connected substantially perpendicular to said third region and releasably engageable with said notch in said upper edge of said right lens, a fifth region connected substantially perpendicular to said fourth region and adjacent to said front surface of said right lens, a sixth region connected substantially perpendicular to said fifth region and releaseably engageable with said notch in said right edge of said right lens, a bridge region connected to said sixth region, a seventh region connected substantially perpendicular to said bridge region and releaseably engageable with said notch in said left edge of said left lens, an eighth region connected substantially perpendicular to said seventh region and adjacent to said front surface of said left lens, a ninth region connected substantially perpendicular to said eighth region and releaseably engageable with said notch in said upper edge of said left lens, a tenth region connected substantially perpendicular to said ninth region and adjacent to said rear surface of said left lens, an eleventh region connected substantially perpendicular to said tenth region and being substantially parallel to said right edge of said left lens and releaseably engageable with said notch in said right edge of said left lens, and a twelfth region connected to said eleventh region and extending substantially parallel to said right edge of said left lens.

9. The modular eyewear assembly of claim 8, further comprising:

a right temple connected to said first region, and a left temple connected to said twelfth region.

10. The modular eyeglass reader assembly of claim 8, wherein said resilient wire material is metal.

11. The modular eyewear assembly of claim 8, wherein said resilient wire material is plastic.

12. The modular eyewear assembly of claim 8, further comprising:

a pair of nose pads connected to said bridge region.

13. The modular eyewear assembly of claim 8, wherein said frame communicates with said left edge, said right edge, said upper edge, said front surface and said rear surface of said right lens and wherein said frame communicates with said left edge, said right edge, said upper edge, said front surface and said rear surface of said left lens.

* * * * *